Patented May 9, 1939

2,157,632

UNITED STATES PATENT OFFICE 2,157,632

BEVERAGE

Abraham Schapiro, Chicago, Ill.

No Drawing. Application February 2, 1939, Serial No. 254,157

13 Claims. (Cl. 99—156)

This invention relates to beverages of the non-alcoholic and low-alcoholic content types and particularly to fruit juices and low-alcoholic content fruit wines.

In the methods of preparing fruit juices such as, for example, grape juice and the like as heretofore practiced, the juice is first expressed from the fruit in any desirable manner and permitted to stand until the flavor develops and until argols (tartrate compounds) and other undesired precipitable matter settles. The precipitated matter is removed and the supernatant juice is then bottled or canned in hermetically sealed containers. It usually requires from about 3 to about 4 weeks and even longer for the undesired matter to settle out on standing. In this rather long period of time, the fruit juices, particularly those containing any substantial amounts of fermentable sugars, undergo alcoholic fermentation and develop alcohol considerably in excess of the amount desired or permitted by law in non-alcoholic beverages.

To prevent the development of alcohol in excess of that desired, some manufacturers have resorted to the undesirable practice of removing part of the fermentable sugars from the juice as expressed from the fruit. Others have pasteurized the fruit juice to accomplish the same result as well as to destroy objectionable bacteria therein. In doing so, however, it was necessary to utilize comparatively high temperatures in the order of about 160 to 180° F. for varying lengths of time up to about 15 minutes and even longer, depending on the particular juice.

By operating in accordance with the present invention, the above and other disadvantages in the prior art methods of processing fruit juices are overcome and I am enabled to produce fruit juices having an enhanced and better flavor and aroma than is present in the fruit juices prepared in accordance with the hitherto known methods.

In carrying out my invention, fruit juices, beverages containing fruit juices, low-alcohol fruit wines and the like are treated with suitable amounts of monochloracetic acid or like water and/or alcohol soluble non-toxic chlorinated compounds. The treatment may be effected in any desirable manner as by mixing the non-toxic agent with the fruit juice in a suitable vessel, preferably at room temperature. If desired, the treatment may be carried out at slightly elevated temperatures in the order of about 90 to 95° F., but usualy this is not essential. It is preferred that the treating vessel be glass-lined or made of some suitable acid resisting metal such as Monel metal, stainless steel and the like.

In practicing my invention, I prefer to treat the juice with monochloracetic acid; however, other non-toxic water and/or alcohol soluble monochloracetic acid compounds may be used. Thus, for example, I have successfully treated fruit juices in accordance with my invention with the ethyl, glycol and glycerol esters of monochloracetic acid. Other esters of monochloracetic acid as well as the aldehydes, ketones, ethers and alkali metal salts of this acid may likewise be used. I have also found that the water-soluble monochlor-aliphatic acids having from 3 to 5 carbon atoms in the chain and the non-toxic water and/or alcohol soluble derivatives thereof may likewise be used; however, these compounds are not in general as effective as the corresponding monochloracetic acid compounds.

The quantity of the non-toxic chlorinated compound used in accordance with my invention may vary rather widely; however, I prefer in general not to utilize more than about 800 to 900 parts thereof per million of fruit juice. For most purposes, I have accomplished the desired result with from about 50 to about 400 parts of the compound per million of the juice and in my preferred practice, I utilize about 250 to 300 parts of the compound per million of the juice.

In accordance with my invention I have successfully treated fruit juices such as grape juice, orange juice, lemon juice, grapefruit juice, cherry juice, raspberry juice, blackberry juice, cider and the like as well as syrups and still and carbonated beverages containing fruit juices. I have also similarly treated fruit wines, particularly those containing about 12 to 13% of alcohol as well as other fermented juices such as vinegar.

The following examples illustrate my invention. It is, of course, to be understood that my invention is not to be construed as limited to the specific details disclosed in these examples since these details may obviously be varied without departing from the scope of the invention disclosed herein.

Example 1

100 gallons of freshly pressed orange juice are charged into a suitable vessel and 3 ounces of monochloracetic acid are added thereto and the mixture is agitated in any suitable manner for about 1 to 5 minutes until the acid is dissolved in the juice. The solution may be immediately packaged in suitable sterile containers although I prefer that it be heated preliminarily to about 110° F. to pasteurize it.

The treated orange juice prior to pasteurization or packaging, may be placed in cold storage and maintained there without deterioration for from 1 to 3 months and even longer at a temperature in the order of about 34° F. When ready for shipment, the treated orange juice may then be pasteurized and packaged as above described.

*Example 2*

100 gallons of freshly pressed grape juice from, for example, Concord grapes are charged into a suitable vessel and 3 ounces of monochloracetic acid are admixed therewith until the acid is dissolved in the grape juice. The treated grape juice is permitted to stand until the flavor develops and until the undesired matter precipitates and settles to the bottom. The supernatant grape juice may then be removed as by decantation or filtration and packaged into suitable sterile containers.

I have observed that by treating grape juice in accordance with my invention, the flavor develops and the undesirable matter precipitates out in about 3 to 4 days. Without this treatment, it usually requires from about 3 to 4 weeks and even longer for the undesirable matter to precipitate out.

*Example 3*

100 gallons of freshly pressed apple juice are charged into a suitable vessel and admixed with 2 ounces of monochloracetic acid and permitted to stand until the flavor develops. This usually requires from 1 to 3 days. The apple juice so treated may be pasteurized at about 115° F., filtered and packaged in suitable sterile containers. I prefer in general to package the treated apple juice while still warm and to leave very little air space at the top of the packages containing the juice.

*Example 4*

100 gallons of fruit juice containing fermentable sugars are charged in a suitable vessel and admixed with one-third of an ounce of monochloracetic acid. The juice is permitted to ferment until the alcohol content thereof is within approximately 1% of the desired alcohol content. At this point, 2 ounces of monochloracetic acid are added to the partially fermented juice. The juice is permitted to ferment further until the alcohol content reaches the desired percentage. At this point about one more ounce of monochloracetic acid is introduced into the fermented juice or low-alcohol content fruit wine. The fruit wine so prepared may be filtered and stored in suitable sterile containers from which it may be withdrawn and bottled.

The treatment of fruit juices in accordance with my invention enables me to obtain fermented or unfermented fruit juices which remain stable in storage or in package form. The treatment of fruit juices in accordance with my invention appears to delay the development of molds (aspergillus etc.) and even, at times, to prevent the development of molds. This treatment also appears to promote the development and formation of esters which impart a most desired flavor and aroma to the juices. While the treatment of fruit juices with a monochloracetic acid compound in accordance with my invention may not necessarily increase the quantity of esters which would normally form in fruit juices without this treatment, it does, however, appear to convert at least some of the normally formed esters into esters capable of imparting a better flavor and aroma to the juices.

By the aid of a monochloracetic acid compound in accordance with my invention, it is possible to arrest continued alcohol fermentation of fruit juices containing fermentable sugars at any desired point by incorporating in the fermented juice suitable amounts of the compound at the time when the desired degree of alcohol fermentation has been attained. Moreover, the juices treated as hereinabove described may be pasteurized with substantially the same results at considerably lower temperatures than the temperatures now utilized. The temperatures utilized in the prior art to pasteurize fruit juices vary from about 160 to 180° F. for various lengths of time up to about 15 minutes and even longer.

Thus by operating in accordance with the present invention and utilizing a monochloracetic acid compound in proportions varying from about 250 to 300 parts to one million parts of juice, fermentation can be arrested at any desired point without pasteurization. Using lesser amounts of the compound, say, from about 50 to 100 parts per million, alcohol fermentation can be arrested by pasteurizing at comparatively low temperatures in the order of about 100 to about 120° F. At 100° F., the treated juices are held for about 5 minutes to accomplish the desired result, and at about 120° F. the treated juices can be flash-pasteurized with the attendant desired results.

An important advantage flows from practicing my invention especially in connection with those fruit juices such as, for example, grape juice which requires long periods of time for the undesired precipitatable matter to settle out. Whereas, in accordance with the prior art, it requires from about 3 to 4 weeks and even longer for the undesired matter to settle out, by operating in accordance with my invention, the undesired matter settles out in about 2 to about 6 days and usually in about 3 to 4 days.

I have found that when fruit juices are admixed with syrups such as, for example, a 32° Bé. sugar water solution, and bottle either as a carbonated or still beverage, either with or without the addition of fruit acids and secondary flavoring materials, that by the addition of about one-half ounce of a 25% aqueous solution of a monochloracetic acid compound to each gallon of syrup, fermentation and mold are effectively prevented. I have also found that by incorporating in a substantially non-fermentable beverage such as root beer or cola drinks, or like lower carbonated drinks, the same desired results are obtained by adding about one-half ounce of a 25% aqueous solution of the compound to each gallon of the syrup prior to charging it with carbonated water. These same results are also obtained by similarly treating natural and/or artificial flavoring extracts or concentrates which are used as bases in the preparation of carbonated or still beverages.

I claim:

1. The method of processing a material of the class consisting of beverages and extracts for use in the preparation of beverages to produce a stabilized product comprising treating the material with a non-toxic monochloracetic acid compound whereby the flavor of the product is improved and the maturity thereof hastened.

2. The method of treating fruit juices to produce a stabilized product comprising incorporating in a fruit juice, small amounts of monochloracetic acid whereby the flavor of the product is improved and the maturity thereof hastened.

3. The method of arresting fermentation in a fruit juice having present therein fermentable sugars to produce a stabilized product, comprising treating a fruit juice with small amounts of monochloracetic acid whereby the flavor of the product is improved and the maturity thereof hastened.

4. The method of processing fruit juices to produce a stabilized product comprising treating a fruit juice with a small amount of monochloracetic acid and pasteurizing the treated juice at comparatively low temperatures whereby the flavor of the product is improved and the maturity thereof hastened.

5. The method of arresting fermentation in a fruit wine containing small amounts of alcohol to produce a stabilized product comprising incorporating therein, monochloracetic acid whereby the flavor of the product is improved and the maturity thereof hastened.

6. The method of preparing stabilized fruit wines to produce a stabilized product comprising fermenting fruit juice in the presence of a small amount of monochloracetic acid until the alcohol content of the juice is within about 1% of the desired amount, adding an additional amount of monochloracetic acid and fermenting the juice to form wine of the desired alcohol content and then stabilizing the alcohol content of the wine by the addition of monochloracetic acid whereby the flavor of the product is improved and the maturity thereof hastened.

7. A stabilized processed material of the class consisting of beverages and extracts for use in the preparation of beverages containing a non-toxic monochloracetic acid compound and stabilized thereby.

8. A stabilized bottled beverage containing monochloracetic acid and stabilized thereby.

9. Fruit juice containing monochloracetic acid and stabilized thereby.

10. A stabilized comparatively low-alcohol content wine containing monochloracetic acid and stabilized thereby.

11. Apple juice containing monochloracetic acid and stabilized thereby.

12. A stabilized fruit juice derived from citrous fruits containing monochloracetic acid and stabilized thereby.

13. Orange juice containing monochloracetic acid and stabilized thereby.

ABRAHAM SCHAPIRO.